US012562666B2

(12) United States Patent
Tomizawa et al.

(10) Patent No.: US 12,562,666 B2
(45) Date of Patent: Feb. 24, 2026

(54) ACTUATOR DRIVING DEVICE AND STEERING SYSTEM PROVIDED WITH THE SAME

(71) Applicants: DENSO CORPORATION, Kariya (JP); TOYOTA JIDOSHA KABUSHIKI KAISHA, Toyota (JP); JTEKT CORPORATION, Kariya (JP)

(72) Inventors: Hiroki Tomizawa, Kariya (JP); Nobuyori Nakajima, Kariya (JP); Tomoaki Yoshimi, Kariya (JP); Toyohiro Hayashi, Kariya (JP); Yosuke Yamashita, Toyota (JP); Shintaro Takayama, Toyota (JP); Yuuta Kajisawa, Kariya (JP); Yuji Fujita, Kariya (JP)

(73) Assignees: DENSO CORPORATION; TOYOTA JIDOSHA KABUSHIKI KAISHA; JTEKT CORPORATION

( * ) Notice: Subject to any disclaimer, the term of this patent is extended or adjusted under 35 U.S.C. 154(b) by 160 days.

(21) Appl. No.: 18/511,618

(22) Filed: Nov. 16, 2023

(65) Prior Publication Data

US 2024/0088814 A1     Mar. 14, 2024

Related U.S. Application Data

(63) Continuation of application No. PCT/JP2022/019686, filed on May 9, 2022.

(30) Foreign Application Priority Data

May 20, 2021     (JP) ................................. 2021-085320

(51) Int. Cl.
H02P 27/06      (2006.01)
B62D 5/04       (2006.01)
(Continued)

(52) U.S. Cl.
CPC ........... H02P 27/06 (2013.01); B62D 5/0484 (2013.01); H02J 9/062 (2013.01); B62D 5/006 (2013.01)

(58) Field of Classification Search
CPC .... B62D 5/0484; B62D 5/006; B62D 5/0481; H02P 27/06; H02P 29/028; H02J 2310/40; H02J 9/062
See application file for complete search history.

(56) References Cited

U.S. PATENT DOCUMENTS

2020/0269913 A1     8/2020   Fujimoto

OTHER PUBLICATIONS

English translation of Written Opinion of the International Searching Authority for PCT/JP2022/019686, date of mailing Jul. 19, 2022. (Year: 2022).*

* cited by examiner

*Primary Examiner* — Calvin Cheung
(74) *Attorney, Agent, or Firm* — Maschoff Brennan

(57) ABSTRACT

When a DC power source fails, the following controls are performed. The normal control is resumed when an inverter input voltage recovers before a standby period elapses after a power failure time. A power source relay is turned off when the standby period elapses without recovery of the voltage. The power source relay is turned on again when a power source relay off period has elapsed from a turn-off time. The normal control is resumed when the inverter input voltage recovers at the turn-on time. The normal control is resumed when the inverter input voltage recovers before the power source relay on period elapses from the turn-on time. The power source relay is turned off, and driving of the actuator is stopped, when the power source relay on period passes without recovery of the voltage.

10 Claims, 12 Drawing Sheets

(51) Int. Cl.
  *H02J 9/06*     (2006.01)
  *B62D  5/00*     (2006.01)

FIRST EMBODIMENT Case1

ACTUATOR DRIVING DEVICE AND STEERING SYSTEM PROVIDED WITH THE SAME

CROSS REFERENCE TO RELATED APPLICATION

The present application is a continuation application of International Patent Application No. PCT/JP2022/019686 filed on May 9, 2022, which designated the U. S. and claims the benefit of priority from Japanese Patent Application No. 2021-085320 filed on May 20, 2021. The entire disclosures of all of the above applications are incorporated herein by reference.

TECHNICAL FIELD

The present disclosure relates to an actuator driving device and a steering system provided with the same.

BACKGROUND

Conventionally, a device to control an actuator has been employed.

SUMMARY

According to an aspect of the present disclosure, an actuator driving device is configured to supply an electric power to an actuator.

BRIEF DESCRIPTION OF THE DRAWINGS

The above and other objects, features and advantages of the present disclosure will become more apparent from the following detailed description taken in conjunction with the accompanying drawings. In the drawings.

DETAILED DESCRIPTION

Figure 1:
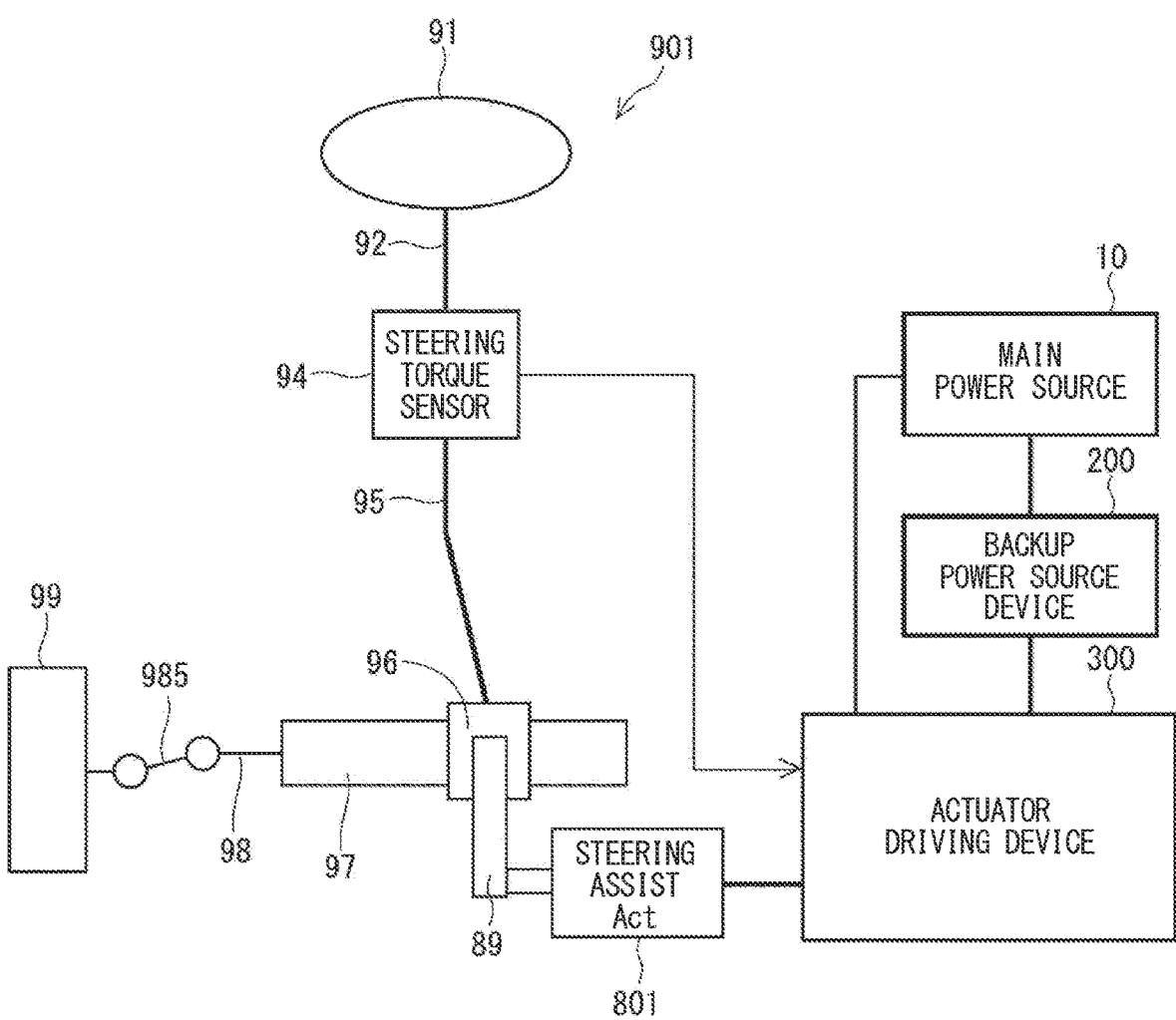
FIG. 1 is a schematic configuration diagram showing an electric power steering system.

Hereinafter, examples of the present disclosure will be described.

According to an example of the present disclosure, a device controls driving of an actuator in the event of a power failure in a steering system of a vehicle. For example, a vehicle control device supplies, in a steer-by-wire vehicle, an electric power from a backup power source in the event of a failure of a main power source, stops a control of a reaction force actuator, and continues a control of a steering with a steering actuator.

A driving device for an actuator of a steering system includes a steer-by-wire system and an electric power steering system. The driving device has a safety function that deactivates a power source relay installed in a power supply line to cut off the power supply, from a perspective of a concern about an overcurrent and prevention of an erroneous output in the event of a failure of a main power source. When a power supply line is switched to the backup power source after a failure of the main power source, both switches are required to be deactivated once. During that time lag, when the power source relay is deactivated due to safety measures, even after switching to the backup power source has been made, an electric power is not supplied unless the power source relay is activated.

This instance occurs, not only when the main power source is switched to the backup power source, but also when recovery from the failure is made after the main power source temporarily fails and an input voltage to an inverter drops. A normal control is a control when the power source is normal. In the above instance, the normal control cannot be resumed properly if the power source relay is deactivated, when the recovery is made in the power source, after the power source fails and the normal control terminates.

According to an example of the present disclosure, an actuator driving device is configured to convert an electric power from a DC power source using an inverter and supply the converted electric power to an actuator. The actuator driving device comprises the inverter, an input voltage detector, a power source relay, and a control unit.

The inverter is configured to be applied with a voltage of the DC power source via a power supply line. The power source relay is provided in the power supply line and configured to, when turned off, cut off an electric current from the DC power source to the inverter. The input voltage detector is configured to detect an inverter input voltage applied to the inverter. The control unit is configured to control an operation of the inverter, detect a failure and a recovery of the DC power source based on a decrease and a recovery of the inverter input voltage, and manipulate the power source relay.

The control unit is configured to, when the DC power source fails, execute a "power failure recovery process" to determine whether to resume a normal control, which is a control when the DC power source is normal. The control unit is configured to perform the following control in the power failure recovery process.

[1] The normal control is resumed when the inverter input voltage recovers in a period from a power failure time before a standby period elapses. The power source relay is turned off at a first turn-off time, which is a time when the standby period has elapsed without recovery of the inverter input voltage.

[2] The power source relay is turned on again at a turn-on time, which is a time when the power source relay off period has elapsed from the turn-off time. The normal control is resumed when the inverter input voltage recovers at the turn-on time.

[3] The normal control is resumed when the inverter input voltage recovers before the power source relay on period elapses from the turn-on time. The power source relay is turned off for the second time at a second turn-off time (t3), which is a time when the power source relay on period has elapsed without recovery of the inverter input voltage.

The control unit is configured to turn off the power source relay for the second time and stop driving of the actuator when a first power source relay off period and a first power source relay on period elapse without recovery of the inverter input voltage. Alternatively, the control unit turns off the power source relay for (N+1)th time and stops driving of the actuator, when the power source relay off period and the power source relay on period are repeated for N times that is two or more times, without recovery of the inverter voltage.

The control unit of the present disclosure alternately repeats, after the DC power fails, a period in which the power source relay is turned on and a period in which the power source relay is turned off, thereby to enable to quickly resume the normal control and to implement safety measures when the inverter input voltage recovers.

To the contrary, the control unit stops driving of the actuator, when a power source relay off period has elapsed once and a power source relay on period has elapsed once, or when the power source relay off period has elapsed for N times (N≥2) and the power source relay on period has elapsed for N times (N≥2), without recovery of the inverter input voltage. In this way, this configuration avoids continuation of unnecessary processing when there is no possibility of the recovery. thus, the present disclosure enables to appropriately determine whether to resume the normal control after the power source fails.

Additionally, the present disclosure is provided as a steering system comprising: a steering assist actuator configured to output a steering assist force, a reaction force actuator configured to output a reaction force against a steering of a driver, or a turning actuator configured to output a turning force to turn a tire; and the above-described actuator drive device. The actuator drive device is configured to drive, as the actuator, at least one of the steering assist actuator, the reaction force actuator, and the turning actuator.

Hereinafter, an actuator driving device according to multiple embodiments will be described with reference to the drawings. The actuator driving device of each embodiment is applied to a steering system of a vehicle, and drives a steering assist actuator, a reaction force actuator, and a steering actuator. The following first to third embodiments are collectively referred to as a "present embodiment". The actuator driving device of the present embodiment drives a motor as a typical actuator.

[Steering System]

Figure 2:
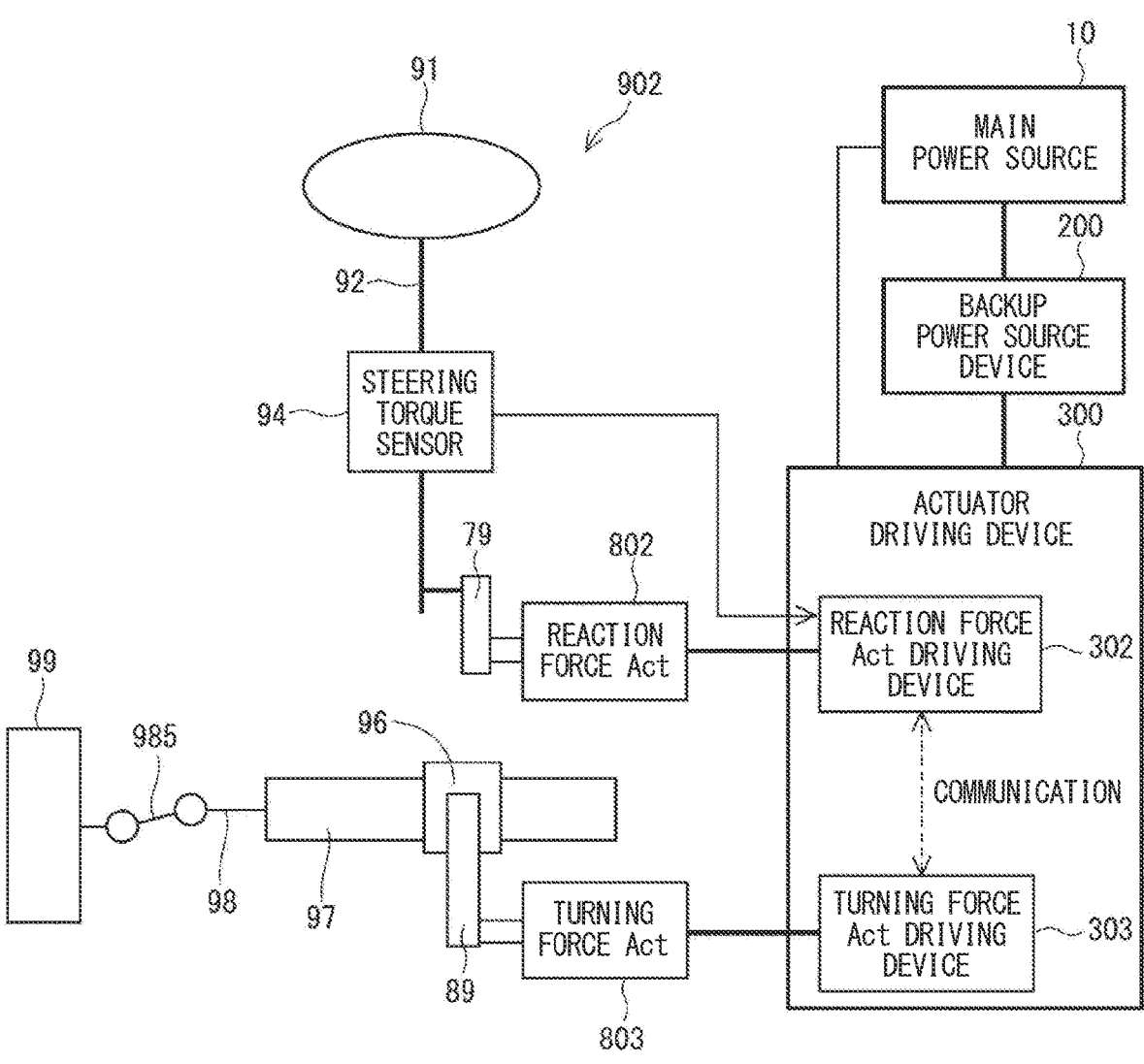
FIG. 2 is a schematic configuration diagram showing a steer-by-wire system.

With reference to FIGS. 1 and 2, a schematic configuration of an electric power steering system (hereinafter, "EPS system") and a steer-by-wire system (hereinafter, "SBW system") will be described as a steering system. In FIGS. 1 and 2, a tire 99 on only one side is shown, and a tire on the opposite side is not shown. Furthermore, due to a space limitation, an "actuator" will be abbreviated as an "Act" in some parts. Substantially the same configurations in FIGS. 1 and 2 are denoted by the same reference numerals, and description thereof will be omitted.

FIG. 1 shows an overall configuration of an EPS system 901 in which a steering mechanism and a turning mechanism are mechanically coupled. Although FIG. 1 shows a rack-assist type EPS system, the same applies to a columnassist-type EPS system. In the EPS system 901, a steering shaft 92 and a rack 97 are connected with each other via an intermediate shaft 95.

When a driver operates a steering wheel 91, a rotational motion of the steering shaft 92 is transmitted to a pinion gear 96 via the intermediate shaft 95. A rotational motion of the pinion gear 96 is converted into a linear motion of the rack 97, and tie rods 98 provided at both ends of the rack 97 reciprocate knuckle arms 985 to turn the tires 99.

The EPS system 901 includes a steering torque sensor 94, an actuator driving device 300, a steering assist actuator 801, and the like. The steering torque sensor 94 is provided at an intermediate portion of the steering shaft 92 to detect a steering torque applied by the driver. The actuator driving device 300 supplies an electric power to the steering assist actuator 801 so as to cause the steering assist actuator 801 to output a desired steering assist force calculated based on the steering torque and the like. The steering assist force output by the steering assist actuator 801 is transmitted to the rack 97 via a reduction gear 89.

A main power source 10 and a backup power source device 200 are connected to the actuator driving device 300. Among the lines connecting the main power source 10 and the actuator driving device 300, a thick solid line indicates a power source line, and a thin solid line indicates a control power source line. Hereinafter, unless otherwise specified, power supply means power supply via a power source line. When the main power source 10 is normal, a DC power of the main power source 10 is supplied to the actuator driving device 300 via the backup power source device 200. On the other hand, a power supply configuration when the main power source 10 fails will be described later with reference to FIG. 3.

FIG. 2 shows an overall configuration of an SBW system 902 in which the steering mechanism and the turning mechanism are mechanically separated. In the SBW system 902, the steering shaft 92 and the rack 97 are separated. A reaction force actuator 802 that outputs a reaction force torque with respect to the steering of the driver is provided on the side of the steering shaft 92. The reaction force generated by the reaction force actuator 802 is transmitted to the steering shaft 92 via a reduction gear 79. A turning actuator 803 that linearly moves the rack 97 to turn the tires 99 is provided on the side of the rack 97. The steering force output by the turning actuator 803 is transmitted to the tires 99 via the reduction gear 89.

The actuator driving device 300 of the SBW system 902 includes a reaction force actuator driving device 302 that supplies an electric power to the reaction force actuator 802 and a steering actuator driving device 303 that supplies an electric power to the turning actuator 803. The reaction force actuator driving device 302 and the steering actuator driving device 303 communicate with each other, and operate the reaction force actuator 802 and the turning actuator 803 to cooperate with each other.

Similarly to FIG. 1, in FIG. 2 as well, the actuator driving device 300 is connected to the main power source 10 and the backup power source device 200, which are "DC power sources". For example, the DC power supplied from the main power source 10 and the backup power source device 200 is distributed to the reaction force actuator driving device 302 and the steering actuator driving device 303. Alternatively, two backup power source devices 200 may be separately provided for the reaction force actuator driving device 302 and the steering actuator driving device 303, respectively.

A three-phase brushless motor is typically used for each of the steering assist actuator 801 of the EPS system 901 and the reaction force actuator 802 and the turning actuator 803 of the SBW system 902. The "actuator" is replaceable with a "motor". In this case, the steering assist motor 801 outputs the steering assist torque, the reaction force motor 802 outputs the reaction torque, and the turning motor 803 outputs the steering torque. In this specification, the motor is basically referred to as an "actuator" since the specification does not refer to a configuration or a control specific to the motor.

[Power Supply Configuration of System]

Subsequently, with reference to FIGS. 3 and 4, a power supply configuration of a system including the main power source 10, the backup power source device 200, and the actuator driving device 300 will be described. The backup power source device 200 includes a backup power source 20, diodes 21 and 22, and a power source switch 25. The main power source 10 is a DC power source with a relatively large capacity. The backup power source 20 is a DC power source with a relatively small capacity, and is an emergency sub-battery used when the main power source 10 fails. In this embodiment, "power source" generally means a DC power source.

The main power source 10 and the backup power source 20 are connected in parallel to a junction 23 of an IG line that is for supplying a control power to a microcomputer 41 of a control unit 40. The diodes 21 and 22 are provided to a point between the main power source 10 and the junction 23 and to a point between the backup power source 20 and the junction 23, respectively, to prevent backflow of a current from the junction 23 to the power sources 10 and 20. Only a low current flows through the IG line. Therefore, even when the main power source 10 fails, the backup power source 20 can supply an electric power without switching the path.

The power source switch 25 is provided on a power supply line (so-called PIG line) and includes a first switch 251 connected to the main power source 10 and a second switch 252 connected to the backup power source 20. Either one of the first switch 251 and the second switch 252 is turned on, or both of the first switch 251 and the second switch 252 are turned off. In order to prevent a current from flowing from the main power source 10 to the backup power source 20 that results in a short circuit, both switches 251 and 252 are operated so as not to be turned on at the same time.

Figure 4:
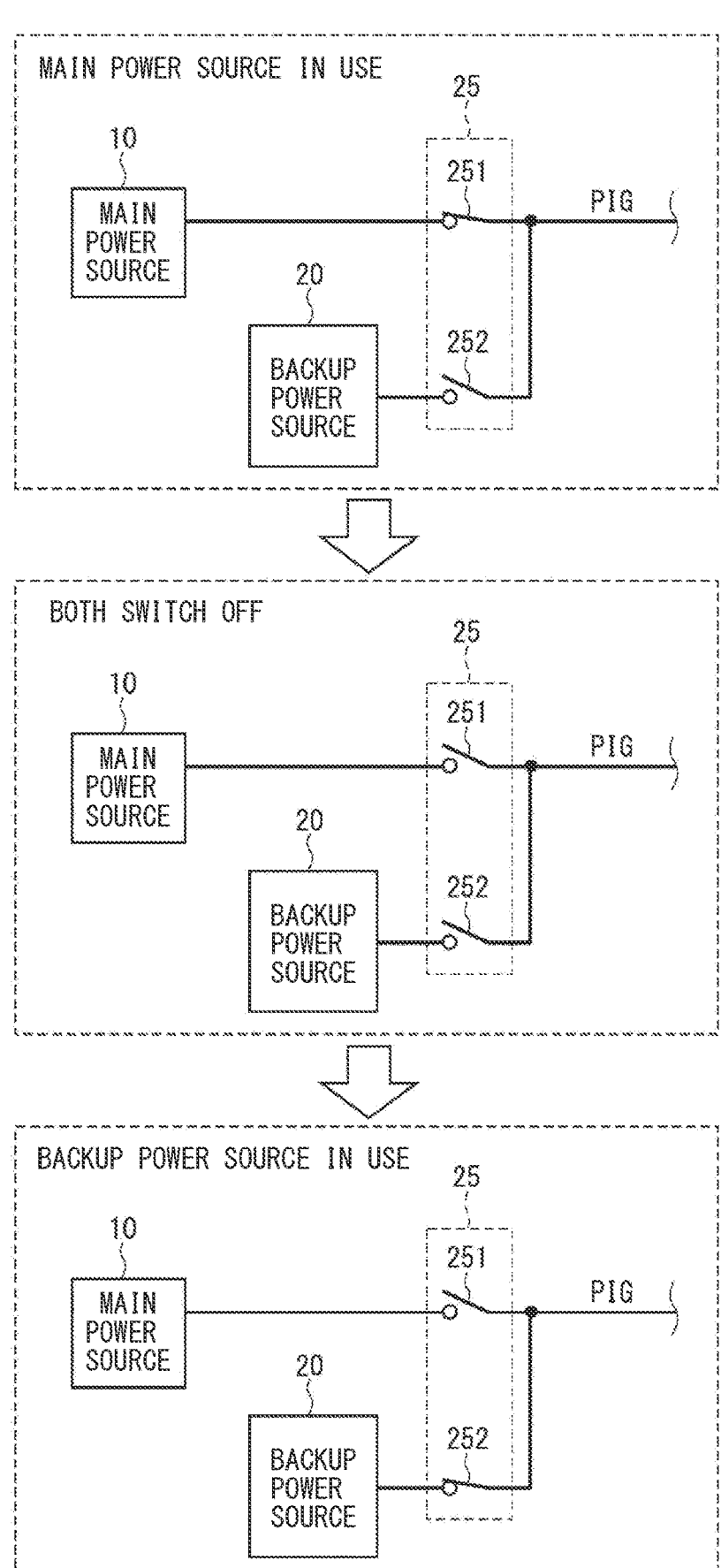
FIG. 4 is a diagram showing a process of switching from the main power source to the backup power source.

As shown in FIG. 4, when the main power source 10 is used, the first switch 251 is turned on and the second switch 252 is turned off. When the main power source 10 is switched to the backup power source 20, both switches 251 and 252 are once turned off. Subsequently, the second switch 252 is turned on, and the backup power source 20 is used. Therefore, a time lag occurs when the power sources are switched.

The actuator driving device 300 converts an electric power from the main power source 10 or the backup power source 20, which are the "DC power sources" using an inverter 50 and supplies the converted electric power to an actuator 80. The "actuator 80", which is a driven object, includes actuators 801, 802, and 803 shown in FIGS. 1 and 2.

The actuator driving device 300 includes the inverter 50, a power source relay 31, an input voltage detector 34, an inverter relay 35, actuator relays 38, and the control unit 40. A voltage is applied to the inverter 50 from the main power source 10 or the backup power source 20, which is the "DC"

power sources", via a power supply line (so-called PIG line). In the figure, the power supply line is shown by a thick solid line.

The inverter 50 is composed of a plurality of switching elements 51 to 56 with three-phase upper and lower arms connected in a bridge manner. The inverter 50 converts the DC power as input into an AC power, and supplies the AC power to the actuator 80. More specifically, the switching elements 51, 52, and 53 are upper arm elements of a U phase, a V phase, and a W phase, respectively. The switching elements 54, 55, and 56 are lower arm elements of the U phase, the V phase, and the W phase, respectively. For example, MOSFETs are used for the switching elements 51 to 56. Illustration of a smoothing capacitor provided at an input section of the inverter 50 is omitted. Further, a shunt resistor for detecting each phase current may be provided, for example, between the lower arm elements 54, 55, and 56 and the ground.

The power source relay 31 is provided midway through the power supply line, that is, between the power sources 10 and 20 and the inverter 50. The power source relay 31 cuts off a current from the power sources 10 and 20 to the inverter 50 when turned off. In the example of FIG. 3, the power source relay 31 is composed of an MOSFET. In this case, even when the power source relay 31 is turned off, a current may flow from the inverter 50 to the power sources 10 and 20 through a parasitic diode of the MOSFET.

The input voltage detector 34 is provided between the power source relay 31 and the inverter 50, and detects an inverter input voltage Vinv applied to the inverter 50 via the power supply line. The inverter input voltage Vinv detected here serves as determination information for performing a power failure recovery process, which will be described later. "Voltage recovery" in the following description means that the inverter input voltage Vinv, which has once decreased, returns to its normal value.

The inverter relay 35 and the actuator relay 38 are optional in this embodiment. At least one of the inverter relay 35 and the actuator relay 38 is preferably provided within the scope of the function of this embodiment, nevertheless, is not essential for a minimum configuration. The inverter relay 35 is provided in the power supply line between the power source relay 31 and the inverter 50, and cuts off the current from the inverter 50 to the power sources 10 and 20 when turned off. Even if a back electromotive voltage of the actuator 80 is reversely inputted via the inverter 50 in a state where the voltage of the power sources 10, 20 has decreased, a regenerative current is prevented from flowing to the power sources 10, 20.

Generally, in an actuator driving device of the EPS system or the SBW system, a similar type of relay is provided as a "reverse connection protection relay" between the power source relay 31 and the inverter 50 to prevent a current from flowing in the reverse direction in the circuit when positive and negative electrodes of a battery are connected in reverse. However, in this embodiment, a situation is not assumed in which the backup power source 20, which is supposed to be used as a substitute when the main power source 10 fails, is connected in reverse. Therefore, this relay is referred to as an "inverter relay" instead of a "reverse connection protection relay" which has a different purpose.

The actuator relays 38 are provided between the inverter 50 and actuator 80, and cut off a current from the actuator 80 to the inverter 50 when turned off. In the example of FIG. 3, three motor relays are respectively provided in the phase current paths of the three-phase motor and are collectively referred to as "actuator relays 38". By turning off the actuator relay 38, the back electromotive force generated by the actuator 80 is prevented from being reversely input to the inverter 50. In a case where the actuator relays 38 are provided and turned off at an appropriate timing, the above function of the inverter relay 35 may not be necessary. However, both the inverter relay 35 and the actuator relay 38 may be provided for a redundant fail-safe configuration.

The control unit 40 controls an operation of the inverter 50 by operating the switching elements 51 to 56 of the inverter 50. Hereinafter, a control when the DC power source is normal will be referred to as a "normal control." The normal control includes both a control when the main power source 10 is normal and a control after switching to the backup power source 20 is completed. In a case where the actuator 80 is a three-phase brushless motor, the control unit 40 performs a current feedback control using a vector control based on a phase current detection value and a motor rotation angle detection value, and generates a drive signal for the inverter 50. Since this is a known motor control technique, the explanation is omitted.

The control unit 40 detects "failure and recovery of the DC power source" based on a decrease and a recovery of the inverter input voltage Vinv acquired from the input voltage detector 34. In this embodiment, "failure of DC power source" means a failure of the main power source 10. "DC power source recovery" means that the switching of the connection to the backup power source 20 has been completed and that the power source relay 31 has been turned on. Furthermore, the control unit 40 operates the power source relay 31, the inverter relay 35, and the actuator relay 38 to perform an on/off control. Inputs and outputs for these functions of the control unit 40 are indicated by solid arrows.

In addition, as shown by the broken line arrow, the control unit 40 detects the current Ibt flowing through the power supply line, and turns off the power source relay 31 when the current Ibt exceeds a predetermined overcurrent threshold to protect the circuit. Although this overcurrent monitoring itself is not a main function of this embodiment, the overcurrent monitoring is related to the background of an issue. That is, in the configuration of this embodiment, when the main power source 10 fails, an overcurrent abnormality in the power supply line is detected, and the power source relay 31 is turned off as a safety measure. Therefore, after switching the connection of the power source switch 25 from the main power source 10 to the backup power source 20 in the backup power source device 200, it is necessary to turn on the power source relay 31 at an appropriate timing. Thus, there is a technical significance in executing the "power failure recovery process".

The control unit 40 of this embodiment includes the microcomputer 41 and a custom IC 42. The control unit 40 includes a CPU, a ROM, a RAM, an I/O, a bus line that connects thereamong, and a like (none shown). The control unit 40 performs a control by executing a software process implemented by the CPU by executing a program stored in advance or by executing a hardware process implemented by a dedicated electronic circuit.

The microcomputer 41 mainly performs an arithmetic control to generate an inverter driving signal in the normal control. The microcomputer 41 also communicates with other devices in the vehicle via an in-vehicle network. As described above, the control power for the microcomputer 41 is input from the main power source 10 or the backup power source 20 via an IG line provided with the backflow prevention diodes 21 and 22.

The custom IC 42 acquires an inverter input voltage Vinv, detects a failure and a recovery of the main power source 10, and operates the power source relay 31 and the like based on the detection result and the monitoring result of an overcurrent abnormality. That is, the power failure recovery process unique to this embodiment is mainly executed by the custom IC 42. By performing the power failure recovery process using the dedicated custom IC 42, it becomes possible to perform the process quickly, and the safety is further improved.

[Power Failure Recovery Process]

When the main power source 10 fails, the control unit 40 executes the "power failure recovery process" that determines whether to resume the normal control. In the present embodiment, the controller 33 executes the power failure recovery process, when the main power source 10 fails, and the DC power source, which is connected to the power supply line, is switched from the main power source 10 to the backup power source 20. The power failure recovery process will be described. Note that, as described in "Other Embodiments", the power supply failure recovery process may be executed when the main power source 10 temporarily fails and then returns after a while.

First Embodiment

With reference to the time charts of FIGS. 5 to 8, the power failure recovery process of the first embodiment will be described for Case 1 to Case 4 depending respectively on recovery timings of the inverter input voltage Vinv. Hereinafter, "recovery of inverter input voltage Vinv" will be abbreviated as appropriate and will be referred to as "voltage recovery".

The vertical axis in the figure shows five items: "main power source status", "backup power source status", "power source relay", "inverter input voltage Vinv", and "actuator control". The "main power source state" and the "backup power source state" are valid when the actuator driving device 300 is supplied with an electric power and are invalid when the actuator driving device 300 is not supplied with an electric power. The states do not indicate a detected voltage at a specific location. When the main power source 10 fails, the "main power source state" changes from valid to invalid. When the switching of the connection to the backup power source 20 is completed, the "backup power source state" changes from invalid to valid.

The horizontal axis in each of FIGS. 5 to 8 shows a power failure time t0, a first turn-off time t1, a first turn-on time t2, and a second turn-off time t3. Notably, t2 and t3 that do not occur in Case 1 and t3 that does not occur in Case 2 are shown in parentheses, and the corresponding vertical lines are shown as broken lines. Common to Cases 1 to 4, the main power source 10 fails at the power failure time t0. The "main power source state" becomes invalid, and the inverter input voltage Vinv drops to 0. Further, the normal control of the main power source 10 is terminated, and the in-abnormality-detection control starts.

A time period from the power failure time t0 to the first turn-off time t1 is defined as a "standby period Twt". A time period from the first turn-off time t1 to the first turn-on time t2 is defined as a "first power source relay off period Toff_1." A time period from the first turn-on time t2 to the second turn-off time t3 is defined as a "first power source relay on period Ton_1".

Herein, the standby period Twt and the power source relay on period Ton_1 are set to have the same length. Thereby, the function of the custom IC 42 can be used effectively. Also in the third embodiment described below, the second and subsequent power source relay on periods Ton_2 . . .

Ton_N are preferably set to have the same length as the standby period Twt and the first power source relay on period Ton_1.

Figure 5:
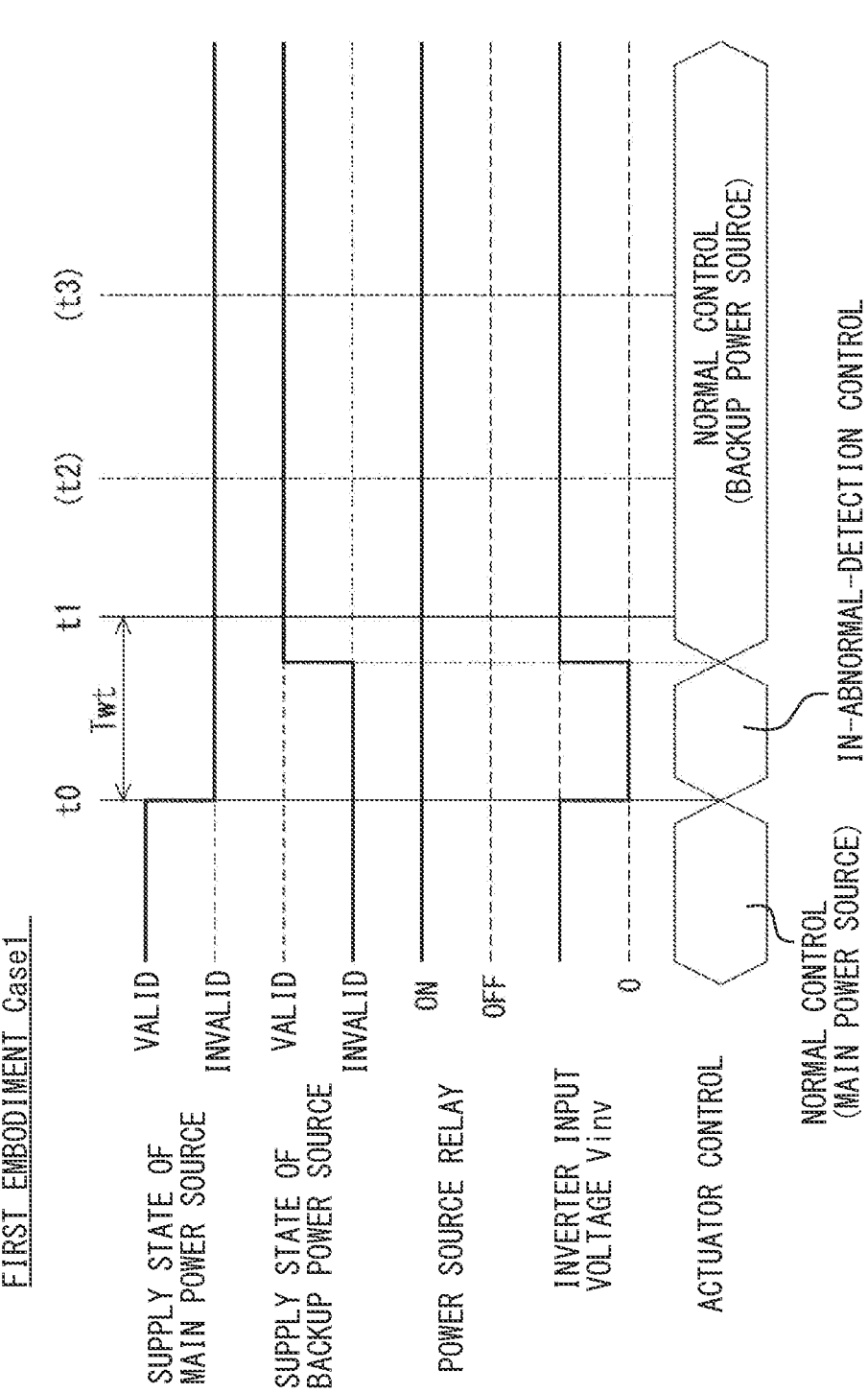
FIG. 5 is a time chart showing a power failure recovery process (Case 1) of the first embodiment.

In Case 1 shown in FIG. 5, switching to the backup power source 20 is completed before the first turn-off time t1, that is, before the time at which the standby period Twt has elapsed, and the "backup power source state" becomes valid. The power source relay 31 is on at this point. Therefore, the voltage is restored simultaneously when the "backup power source state" becomes valid. The control unit 40 resumes the normal control with the backup power source 20 at the same time when the voltage recovers.

Figure 6:
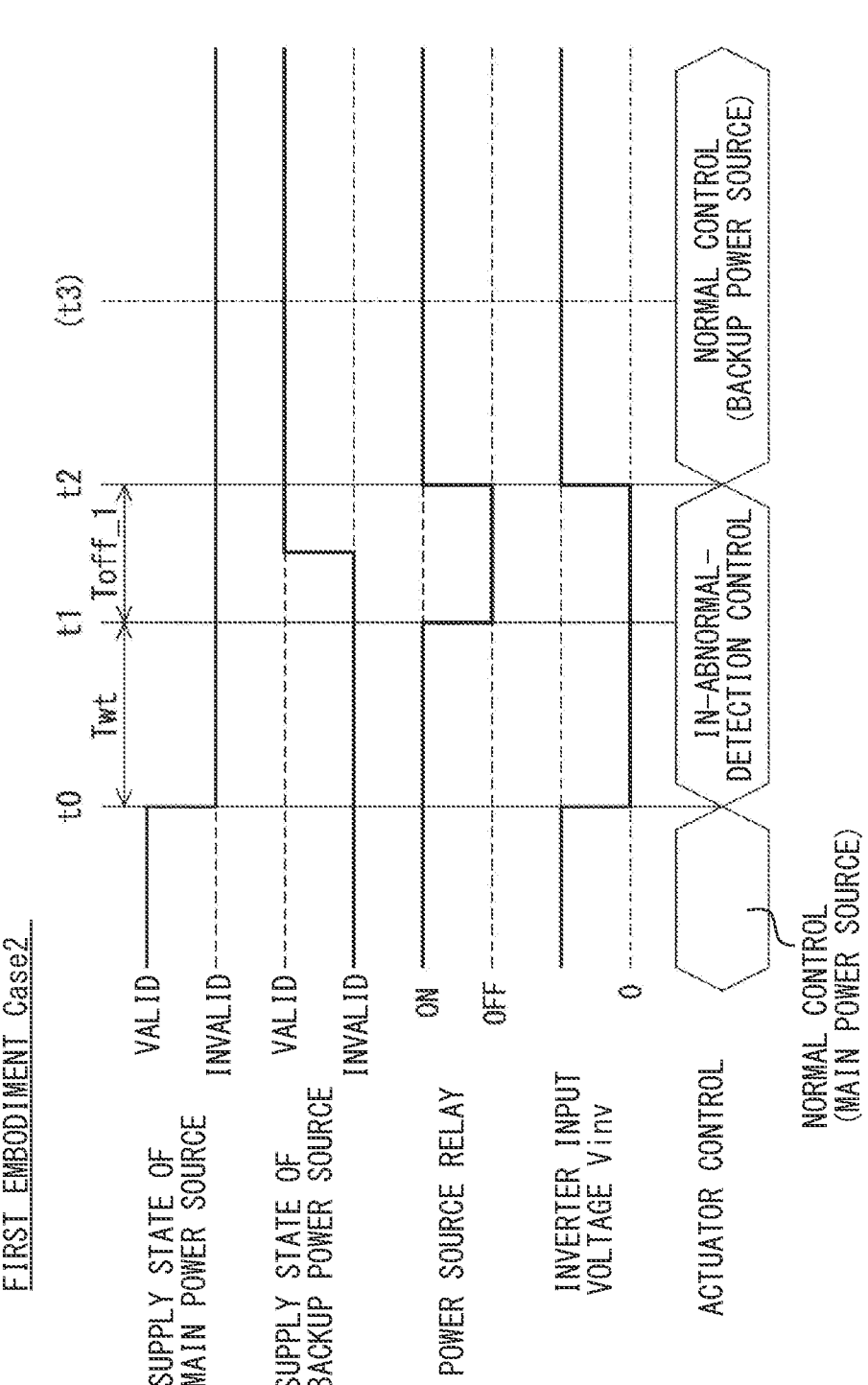
FIG. 6 is a time chart showing a power failure recovery process (Case 2) of the first embodiment.
Figure 7:
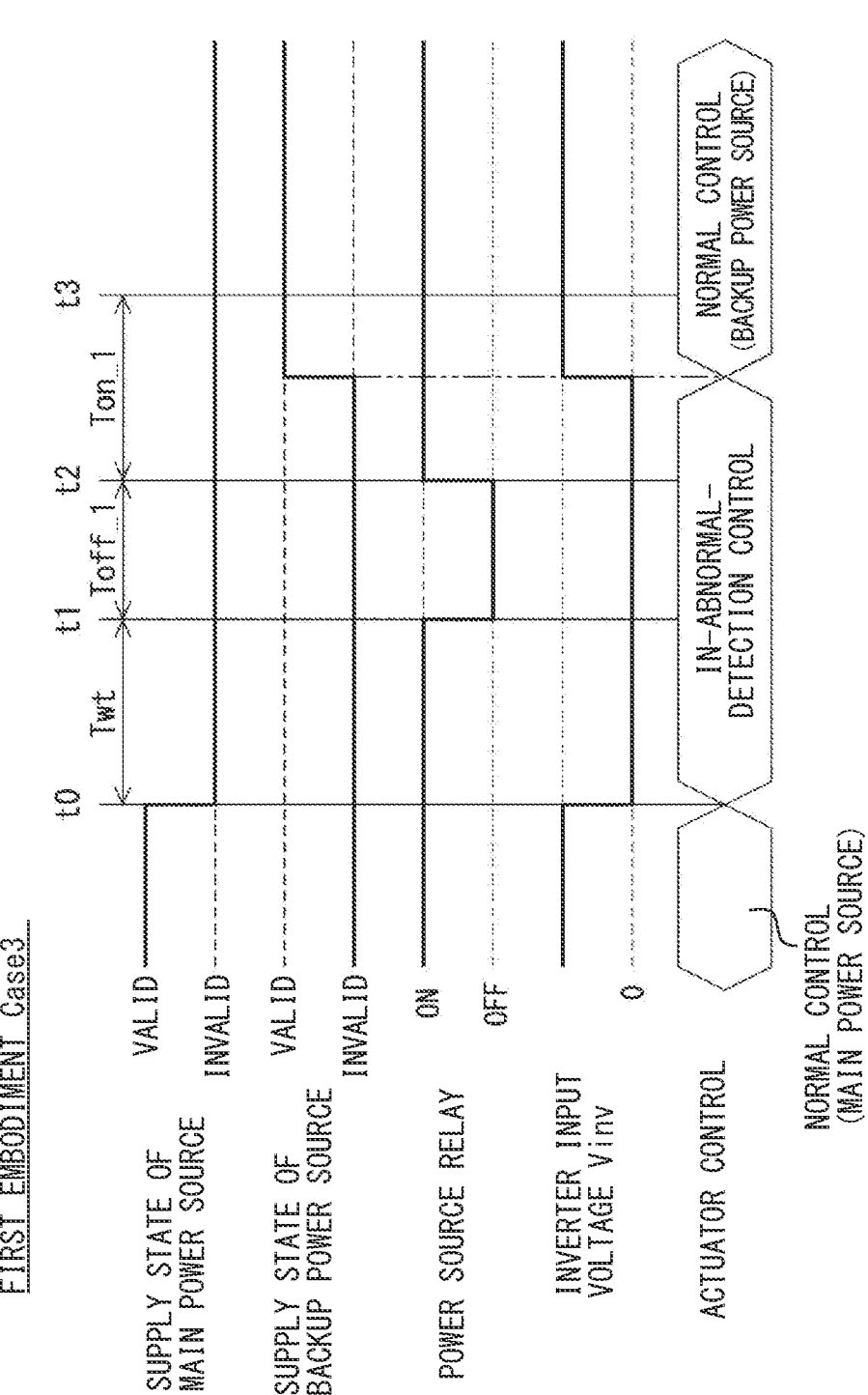
FIG. 7 is a time chart showing a power failure recovery process (Case 3) of the first embodiment.
Figure 8:
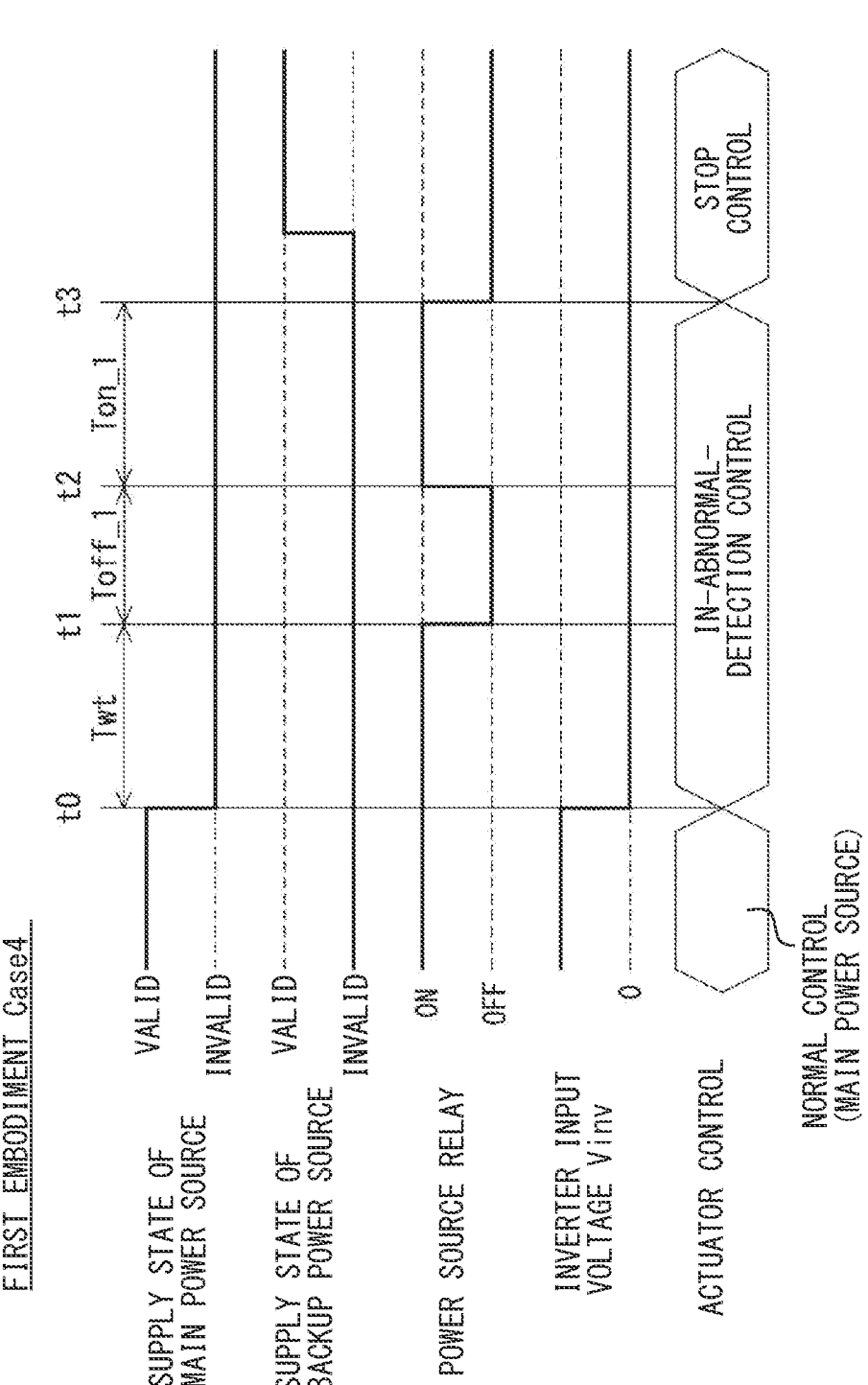
FIG. 8 is a time chart showing a power failure recovery process (Case 4) of the first embodiment.

As shown in FIGS. 6 to 8, the standby period Twt elapses without recovery of the voltage. In this case, the control unit 40 turns off the power source relay 31 at the first turn-off time t1 when the standby period Twt has elapsed.

In Case 2 shown in FIG. 6, switching to the backup power source 20 is completed in a period from the first turn-off time t1 to the first turn-on time t2, that is, before the first power source relay off period Toff_1 has elapsed, and the "backup power source state" becomes valid. At this time, the voltage does not return, because the power source relay 31 is off.

At the first turn-on time t2, which is a time when the first power source relay off period Toff_1 has elapsed from the first turn-off time t1, the control unit 40 turns on the power source relay 31 again. In Case 2, the voltage recovers at the first turn-on time t2. In this case, the control unit 40 resumes the normal control with the backup power source 20 at the same time when the voltage recovers.

In Case 3 shown in FIG. 7, the switching to the backup power source 20 is completed in a period from the first turn-on time t2 to the second turn-off time t3, that is, before the first power source relay on period Ton_1 has elapsed, and the "backup power source state" becomes valid. The power source relay 31 is on at this point. Therefore, the voltage is restored simultaneously when the "backup power source state" becomes valid. The control unit 40 resumes the normal control with the backup power source 20 at the same time when the voltage recovers.

As shown in FIG. 8, the first power source relay on period Ton_1 has elapsed without the voltage recovery. In this case, at the second turn-off time t3, which is a time when the first power source relay on period Ton_1 has elapsed, the control unit 40 turns off the power source relay 31 for the second time.

In Case 4 shown in FIG. 8, switching to the backup power source 20 is completed after the second turn-off time t3. Alternatively, in Case 4, the switching to the backup power source 20 is not completed permanently. For example, a case is assumed in which the backup power source 20 or the power source switch 25 of the backup power source device 200 is abnormal. Therefore, in the first embodiment, when the second turn-off time t3 has been reached, it is considered that time up occurs.

That is, when the a single power source relay off period Toff_1 and the a single power source relay on period Ton_1 have elapsed without recover of the voltage, the control unit 40 turns off the power source relay 31 for the second time and terminates the driving of the actuator 80. In this way, at the second turn-off time t3, the abnormality detection control is terminated, and the stop control is started.

Figure 9:
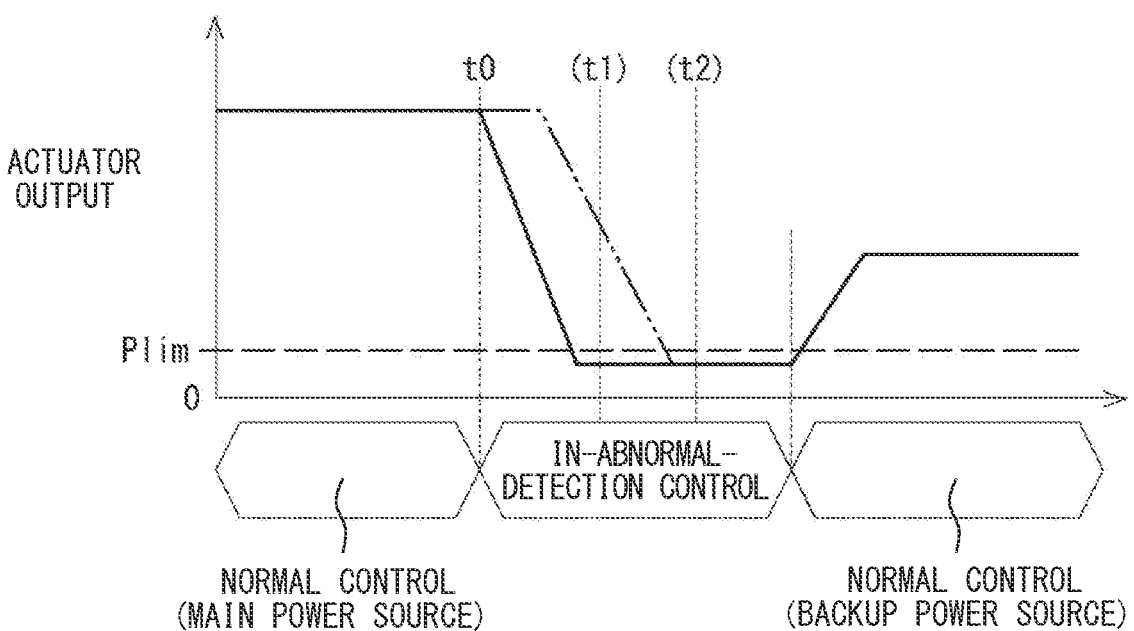
FIG. 9 is a diagram showing an output limitation of an actuator in the power failure recovery process.

Subsequently, with reference to FIG. 9, an output limitation of the actuator 80 in the power failure recovery process will be described. The control unit 40 limits the output of the actuator 80 to a predetermined output limit value Plim or less in a period between the power supply failure time t0 and the time when the inverter input voltage Vinv recovers. For example, the control unit 40 may set the output of the actuator 80 to 0.

The timing, at which the output limit value is reduced, is not limited to the case shown by the solid line where the limitation is completed before the first turn-off time t1. For example, in Case 2 and Case 3, the limitation may be completed before the first turn-on time t2, as shown by the broken line. After the voltage recovers, the control unit 40 cancels the output limitation of the actuator 80. in this way, sudden generation of the output of the actuator 80 can be suppressed when the normal control is resumed. Preferably, when the control unit 40 changes the output limit value, the output limit value is changed gradually, in order to avoid a sudden change.

Furthermore, when resuming the normal control using the backup power source 20, the control unit 40 limits the output of the actuator 80 compared to the output in the normal control with the main power source 10. The capacity of the backup power source 20 is smaller than the capacity of the main power source 10. Therefore, by limiting the output, it is possible to extend a time period in which the control is continued. For example, the output limit value of the actuator 80 may be set according to a charge amount of the backup power source 20.

Figure 10:
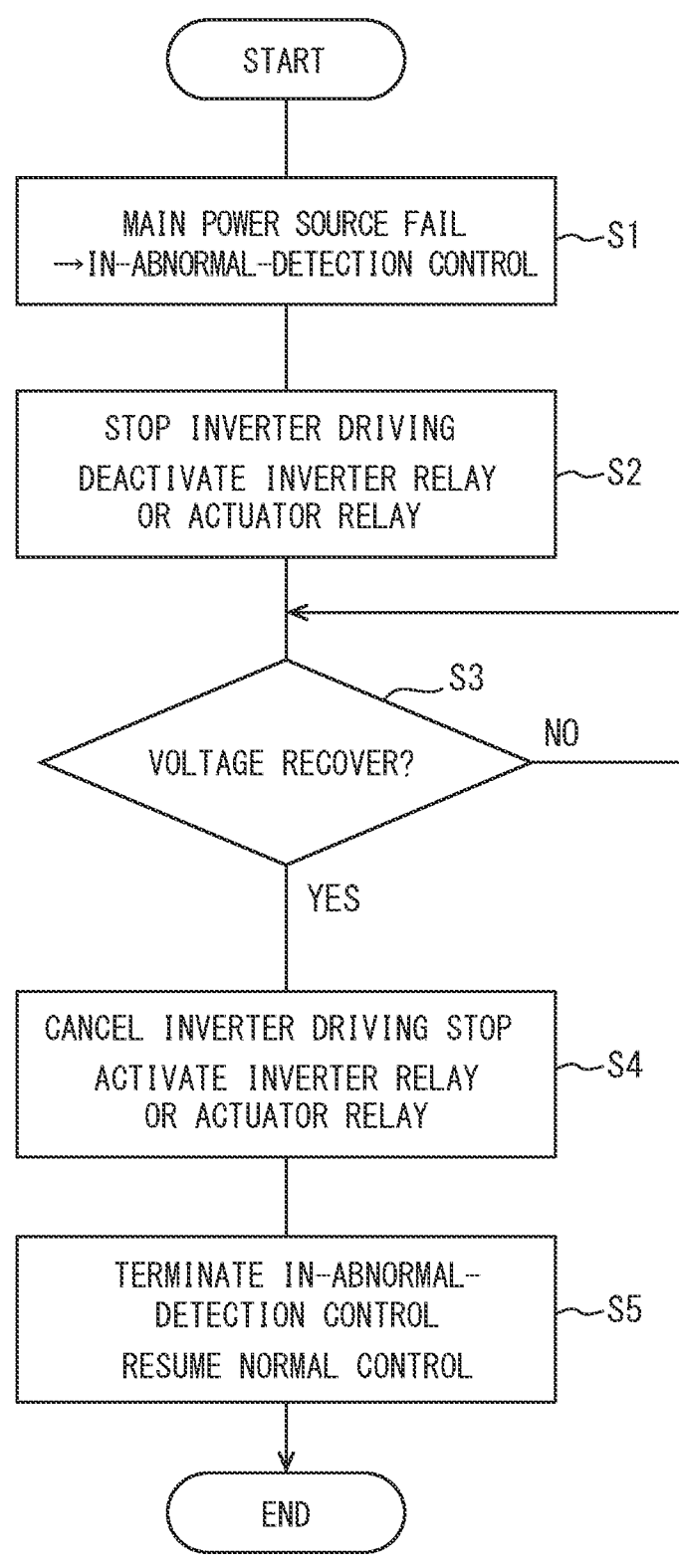
FIG. 10 is a flowchart showing an inverter driving stop and the like in an in-abnormality-detection control.

The process in the abnormality detection control will be described with reference to the flowchart in FIG. 10. In the description of the flowchart, a symbol "S" indicates a step. In S1, the main power source 10 fails at time t0, and the control unit 40 shifts from the normal control to the abnormality detection control. In S2, the control unit 40 stops the driving of the inverter 50 and turns off at least one of the inverter relay 35 and the actuator relay 38. "Stopping of the driving of the inverter 50" means turning off the upper and lower arm elements 51 to 56 of all the phases. This state continues until it is determined in S3 that the voltage has been recovered.

When it is determined in S3 that the voltage has been recovered, the control unit 40 cancels the stopping of the driving of the inverter 50 and turns on the inverter relay 35 and the actuator relay 38 in S4. Note that the power source relay 31 is already turned on at the time when it is determined that the voltage has been recovered. Further, in S5 at the same time as S4, the control unit 40 terminates the abnormality detection control and resumes the normal control.

In this way, the control unit 40 stops the driving of the inverter 50 from the time t0 when the power source fails until the time when the voltage has been recovered. This process prevents the voltage generated by the inverter 50 from being applied to the power sources 10 and 20. In addition, the control unit 40 turns off at least one of the inverter relay 35 and the actuator relay 38. This process prevents the regenerative current from flowing from the inverter 50 to the power sources 10 and 20 due to a reverse input from the actuator 80.

As described above, the control unit 40 of the first embodiment alternately repeats the period in which the power source relay 31 is turned on and the period in which the power source relay 31 is turned off after the main power source 10 fails. This process enables to quickly restart the normal control and implement safety measures when the inverter input voltage Vinv recovers. On the other hand, when each of the power source relay off period Toff_1 and the power source relay on period Ton_1 elapses once without recovery of the voltage, the control unit 40 stops driving of the actuator 80. In this way, this configuration avoids continuation of unnecessary processing when there is no possibility of the recovery. In this way, the present embodiment enables to appropriately determine whether to resume the normal control after the power source fails.

In particular, the power failure recovery process of this embodiment is executed in the system including the main power source 10 and the backup power source 20, when the main power source 10 fails and when the DC power source connected to the power supply line is switched from the main power source 10 to the backup power source 20. This configuration enables to efficiently and safely resume the normal control after the main power source 10 is switched to the backup power source 20. This configuration is suitable particularly for the EPS system and the SBW system that require a high reliability.

Second Embodiment

Figure 11:
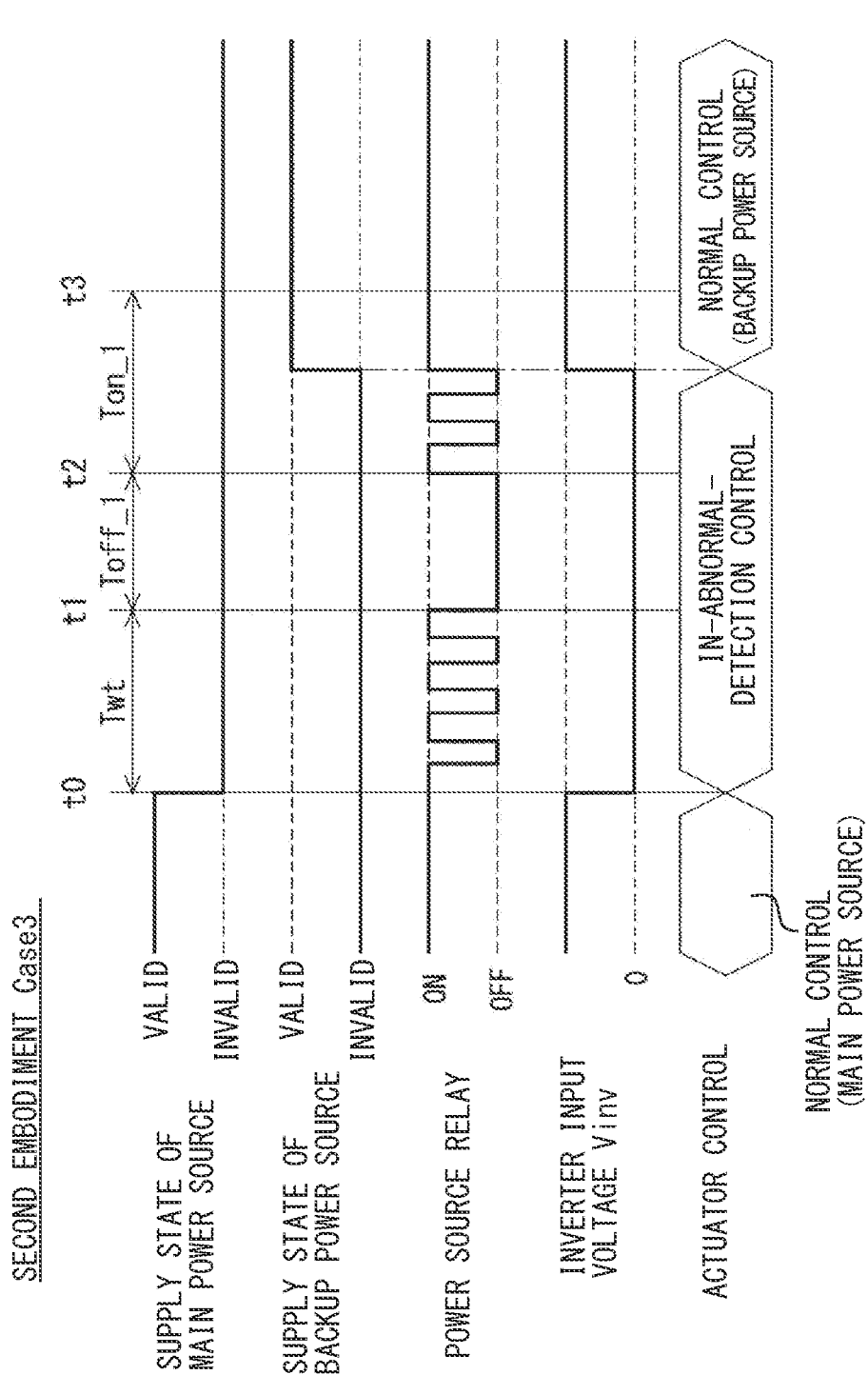
FIG. 11 is a time chart showing a power failure recovery process of a second embodiment.

With reference to FIG. 11, the power failure recovery process of the second embodiment will be described. FIG. 11 representatively shows a control according to Case 3 (FIG. 7) of the first embodiment. The control unit 40 does not turn on the power source relay 31 all the time but intermittently turns on and off the power source relay 31 in the standby period Twt, which is from the power failure time t0 to the time when the inverter input voltage Vinv recovers, and the power source relay on period Ton_1.

When the power source relay 31 is regularly turned on during the abnormality detection control, there is a risk that the inverter elements 51 to 56 and the like may be damaged due to heat generated in an overcurrent state. Therefore, in the abnormality detection control, by intermittently turning on and off the power source relay 31, it is possible to suppress heat generation due in the overcurrent state. The duty ratio of the intermittent operation may be a fixed value, or may be set variably according to the detected current value or the like.

Third Embodiment

Figure 12:
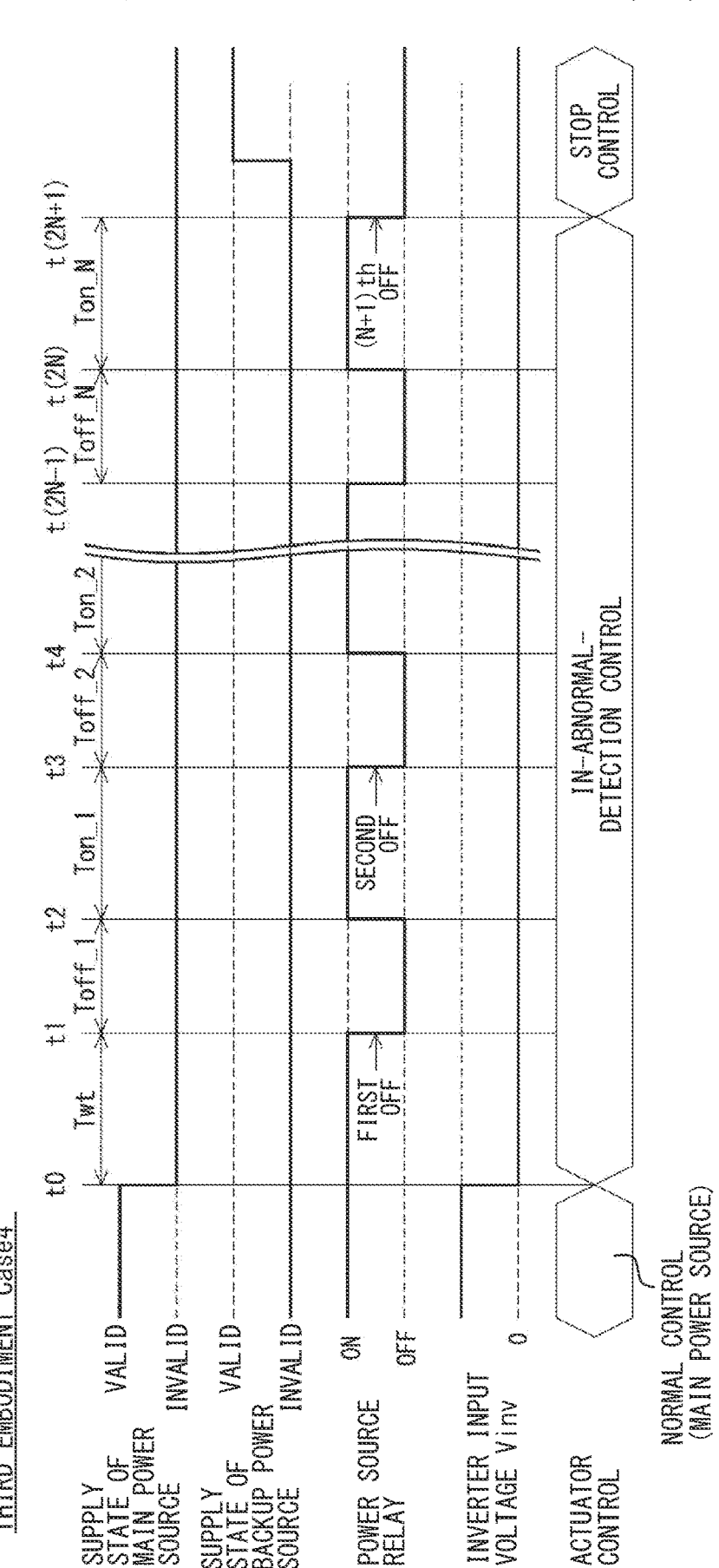
FIG. 12 is a time chart showing a power failure recovery process of a third embodiment.

With reference to FIG. 12, the power failure recovery process of the third embodiment will be described. FIG. 12 representatively shows a control according to Case 4 (FIG. 8) of the first embodiment. The third embodiment has the same operation as that of the first embodiment until the second turn-off time t3. However, the third embodiment is different from the second embodiment in the timing at which driving of the actuator 80 is stopped, in other words, the timing at which the abnormality detection control is shifted to the stop control.

In FIG. 12, the "backup power source supply state" continues to be invalid from the power failure time t0 until the time where the final transition to the stop control is made. At the second turn-off time t3, the control unit 40 turns off the power source relay 31, and transitions to a second power source relay off period Toff_2 is made. Subsequently, when the power source relay off period Toff_2 elapses at a second turn-on time t4, the control unit 40 turns on the power source relay 31, and transition to the second power source relay on period Ton_2 is made.

Assuming if switching to the backup power source 20 is completed during the second power source relay off period Toff_2, the normal control is resumed at the second turn-on time t4, similarly to Case 2 of the first embodiment. Assuming if switching to the backup power source 20 is completed during the second power source relay on period Ton_2, the normal control is resumed at the same time as the time where the voltage recovers, similarly to Case 3 of the first embodiment.

Thereafter, the power source relay off period and the power source relay on period Ton are repeated for N times (N≥2). At an (N−1)th turn off time t(2N−1), the control unit 40 turns off the power source relay 31, and transition to an N-th power source relay off period Toff_N is made. At an N-th turn-on time t(2N), the control unit 40 turns on the power source relay 31, and transition to an N-th power source relay on period Ton_N is made.

Thereafter, at an (N+1)th turn-off time t(2N+1) after the Nth power source relay on period Ton_N has elapsed, the control unit 40 turns off the power source relay 31 for the (N+1)th time and stops driving of the actuator 80. That is, the control unit 40 turns off the power source relay 31 for the (N+1)th time and stops driving of the actuator 80, when the power source relay off period and the power source relay on period are repeated for the N times that is two or more times, without recovery of the voltage.

In the third embodiment, it is possible to secure a chance to resume the normal control as long as possible before finally shifting to the stop control. Alternatively, assuming if a total time period until transition to the stop control is made is set to be the same as the time period in the first embodiment, the power source relay off period and the power source relay on period are repeated for many times in a short cycle, thereby to enable to reduce the time lag from the time, at which the switching is completed, to the time at which the normal control is resumed in Case 2.

OTHER EMBODIMENTS (a) The actuator 80 driven by the actuator driving device 300 may be another device than the motor that outputs the torque through rotation and may be an electric linear actuator that outputs a linear force or the like. In addition, the "inverter" may include an H-bridge circuit that converts a current direction of the input DC power. The actuator may include a DC actuator such as a DC motor.

(b) One or both of the inverter relay 35 and the actuator relay 38 may not be provided. In this case, the item to turn off the relay that does not exist is excluded from the processing in the abnormality detection control shown in FIG. 10.

Figure 3:
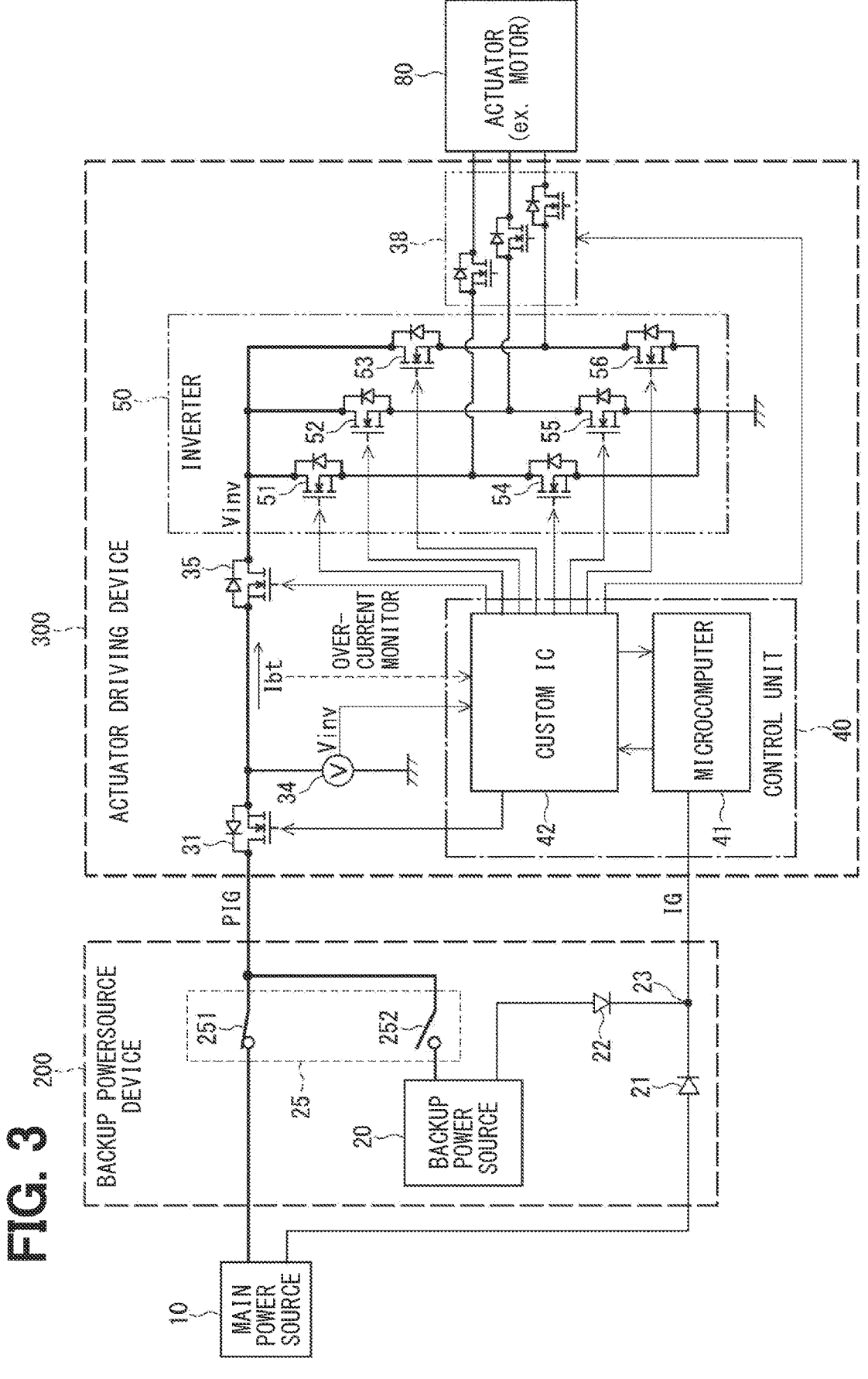
FIG. 3 is a power supply configuration diagram showing a system including a main power source, a backup power source device, and an actuator driving device.

(c) The semiconductor switching elements are illustrated in FIG. 3 as the power source relay 31, the inverter relay 35, and the actuator relay 38. The present invention is not limited to this, and each of the relays may be composed of a mechanical relay.

(d) The power failure recovery process is not limited to that switches to the backup power source 20 when the main power source 10 fails. The power failure recovery process may be executed when the power source temporarily fails and then recovers after a while. In other words, the present disclosure is not limited to the system including the main power source 10 and the backup power source 20. The present disclosure is also applicable to a system equipped with only one DC power source. In this case, when the normal control is resumed, and the actuator output limitation is canceled, the actuator output may be set to a level similar to that before the power source failure.

(e) The present disclosure is not limited to be applied to the EPS or SBW steering systems. The present disclosure may be applied to various actuator driving systems in which an electric power from a DC power source is converted by an inverter and supplied to an actuator.

The present disclosure should not be limited to the embodiment described above. Various other embodiments may be implemented without departing from the scope of the present disclosure.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. An actuator driving device configured to convert an electric power from a DC power source using an inverter and supply the electric power to an actuator, the actuator driving device comprising:

the inverter configured to be applied with a voltage of the DC power source via a power supply line;

a power source relay provided in the power supply line and configured to, when turned off, cut off an electric current from the DC power source to the inverter;

an input voltage detector configured to detect an inverter input voltage applied to the inverter; and a control unit configured to control an operation of the inverter;

detect a failure and a recovery of the DC power source based on a decrease and a recovery of the inverter input voltage, and manipulate the power source relay, wherein the control unit is configured to, when the DC power source fails, execute a power failure recovery process to determine whether to resume a normal control, which is a control when the DC power source is normal, and the control unit is configured to, in the power failure recovery process, resume the normal control when the inverter input voltage recovers before a standby period elapses from a power failure time at which the DC power source fails, turn off the power source relay at a first turn-off time, which is a time when the standby period has elapsed without recovery of the inverter input voltage, turn on the power source relay again at a turn-on time, which is a time when a power source relay off period has elapsed from the turn-off time, and resume the normal control when the inverter input voltage recovers at the turn-on time, resume the normal control when the inverter input voltage recovers before a power source relay on period elapses from the turn-on time, and turn off the power source relay for a second time at a second turn-off time, which is a time when the power source relay on period has elapsed without recovery of the inverter input voltage, and the control unit is configured to, in the power failure recovery process, turn off the power source relay for the second time and stop driving of the actuator when a single power source relay off period and a single power source relay on period have elapsed without recovery of the inverter input voltage, or turn off the power source relay for an (N+1)th time and stop driving of the actuator when an Nth power source relay off period and an Nth power source relay on period, which have been repeated twice or more, have elapsed without recovery of the inverter input voltage.

2. The actuator driving device according to claim 1, wherein the control unit is configured to, in a system including a main power source, which is a DC power source with a relatively large capacity, and a backup power source, which is a DC power source with a relatively small capacity and configured to be used when the main power source fails, when the main power source fails, and when the DC power source connected to the power supply line is switched from the main power source to the backup power source, execute the power failure recovery process.

3. The actuator driving device according to claim 2, wherein the control unit is configured to, when resuming the normal control with the backup power source, limit an output of the actuator compared to the output in the normal control with the main power source.

4. The actuator driving device according to claim 1, wherein the control unit is configured to limit an output of the actuator to a predetermined output limit value or less in a period from the power failure time to a time at which the inverter input voltage recovers, and cancel output limitation of the actuator after the inverter input voltage recovers.

5. The actuator driving device according to claim 1, wherein the control unit is configured to intermittently turn on and turn off the power source relay in the standby period, which is from the power failure time to a time at which the inverter input voltage recovers, and in the power source relay on period.

6. The actuator driving device according to claim 1, wherein the standby period and the power source relay on period are set to a same length.

7. The actuator driving device according to claim 1, wherein the control unit is configured to stop driving of the inverter in a period from the power failure time to a time at which the inverter input voltage recovers.

8. The actuator driving device according to claim 1, further comprising:

at least one of: an inverter relay provided between the power source relay and the inverter in the power supply line and configured to, when turned off, cut off an electric current from the inverter to the DC power source; or an actuator relay provided between the inverter and the actuator and configured to, when turned off, cut off an electric current from the actuator to the inverter, wherein
the control unit is configured to turn off the inverter relay or the actuator relay in a period from the power failure time to a time at which the inverter input voltage recovers.

9. A steering system comprising:
a steering assist actuator configured to output a steering assist force, a reaction force actuator configured to output a reaction force against a steering of a driver, or a turning actuator configured to output a turning force to turn a tire; and
an actuator driving device configured to convert an electric power from a DC power source using an inverter and supply the electric power to an actuator, the actuator driving device comprising:
the inverter configured to be applied with a voltage of the DC power source via a power supply line;
a power source relay provided in the power supply line and configured to, when turned off, cut off an electric current from the DC power source to the inverter;
an input voltage detector configured to detect an inverter input voltage applied to the inverter; and
a control unit configured to:
control an operation of the inverter;
detect a failure and a recovery of the DC power source based on a decrease and a recovery of the inverter input voltage; and
manipulate the power source relay, wherein
the control unit is configured to, when the DC power source fails, execute a power failure recovery process to determine whether to resume a normal control, which is a control when the DC power source is normal, and
the control unit is configured to, in the power failure recovery process,
resume the normal control when the inverter input voltage recovers before a standby period elapses from a power failure time at which the DC power source fails,
turn off the power source relay at a first turn-off time, which is a time when the standby period has elapsed without recovery of the inverter input voltage,
turn on the power source relay again at a turn-on time, which is a time when a power source relay off period has elapsed from the turn-off time, and resume the normal control when the inverter input voltage recovers at the turn-on time,
resume the normal control when the inverter input voltage recovers before a power source relay on period elapses from the turn-on time, and
turn off the power source relay for a second time at a second turn-off time, which is a time when the power source relay on period has elapsed without recovery of the inverter input voltage, and
the control unit is configured to, in the power failure recovery process,
turn off the power source relay for the second time and stop driving of the actuator when a single power source relay off period and a single power source relay on period have elapsed without recovery of the inverter input voltage, or
turn off the power source relay for an (N+1)th time and stop driving of the actuator when an Nth power source relay off period and an Nth power source relay on period, which have been repeated twice or more, have elapsed without recovery of the inverter input voltage, wherein
the actuator driving device is configured to drive, as the actuator, at least one of the steering assist actuator, the reaction force actuator, or the turning actuator.

10. An actuator driving device comprising:
an inverter configured to be applied with a voltage of a DC power source via a power supply line, the inverter configured to convert an electric power from the DC power source and supply the electric power to an actuator;
a power source relay provided in the power supply line and configured to, when turned off, cut off an electric current from the DC power source to the inverter;
an input voltage detector configured to detect an inverter input voltage applied to the inverter; and
a processor configured to
control an operation of the inverter;
detect a failure and a recovery of the DC power source based on a decrease and a recovery of the inverter input voltage, and
manipulate the power source relay, wherein
the processor is configured to, when the DC power source fails, execute a power failure recovery process to determine whether to resume a normal control, which is a control when the DC power source is normal, and
the processor is configured to, in the power failure recovery process,
resume the normal control when the inverter input voltage recovers before a standby period elapses from a power failure time at which the DC power source fails,
turn off the power source relay at a first turn-off time, which is a time when the standby period has elapsed without recovery of the inverter input voltage,
turn on the power source relay again at a turn-on time, which is a time when a power source relay off period has elapsed from the turn-off time, and resume the normal control when the inverter input voltage recovers at the turn-on time,
resume the normal control when the inverter input voltage recovers before a power source relay on period elapses from the turn-on time, and
turn off the power source relay for a second time at a second turn-off time, which is a time when the power source relay on period has elapsed without recovery of the inverter input voltage, and
the processor is configured to, in the power failure recovery process,
turn off the power source relay for the second time and stop driving of the actuator when a single power source relay off period and a single power source relay on period have elapsed without recovery of the inverter input voltage, or
turn off the power source relay for an (N+1)th time and stop driving of the actuator when an Nth power source relay off period and an Nth power source relay on period, which have been repeated twice or more, have elapsed without recovery of the inverter input voltage.

* * * * *